(12) United States Patent
Takehara

(10) Patent No.: US 10,917,604 B2
(45) Date of Patent: Feb. 9, 2021

(54) CAPTURED IMAGE DISPLAY DEVICE, CAPTURED IMAGE DISPLAY METHOD, AND CAPTURED IMAGE DISPLAY PROGRAM

(71) Applicant: JVC KENWOOD Corporation, Yokohama (JP)

(72) Inventor: Hideki Takehara, Yokohama (JP)

(73) Assignee: JVC KENWOOD CORPORATION, Yokohama (JP)

( * ) Notice: Subject to any disclaimer, the term of this patent is extended or adjusted under 35 U.S.C. 154(b) by 0 days.

(21) Appl. No.: 16/142,286

(22) Filed: Sep. 26, 2018

(65) Prior Publication Data

US 2019/0098248 A1  Mar. 28, 2019

(30) Foreign Application Priority Data

Sep. 27, 2017 (JP) ................... 2017-186446
Sep. 7, 2018  (JP) ................... 2018-167795

(51) Int. Cl.
| | | |
|---|---|---|
| H04N 5/445 | (2011.01) | |
| H04N 5/247 | (2006.01) | |
| H04N 5/265 | (2006.01) | |
| H04N 5/268 | (2006.01) | |
| H04N 21/431 | (2011.01) | |

(Continued)

(52) U.S. Cl.
CPC ......... *H04N 5/44504* (2013.01); *H04N 5/247* (2013.01); *H04N 5/265* (2013.01); *H04N 5/268* (2013.01); *H04N 5/2624* (2013.01); *H04N 7/18* (2013.01); *H04N 7/181* (2013.01); *H04N 21/4312* (2013.01); *H04N 21/44* (2013.01); *H04N 21/4316* (2013.01); *H04N 21/47* (2013.01)

(58) Field of Classification Search
None
See application file for complete search history.

(56) References Cited

U.S. PATENT DOCUMENTS 8,248,503 B2 * 8/2012 Sogoh ............... G06T 17/05
                                                 348/333.02
9,423,268 B2 * 8/2016 Blumenberg ........ G01C 21/367
(Continued)

FOREIGN PATENT DOCUMENTS

| JP | H11-102495 A | 4/1999 |
|---|---|---|
| JP | 2008-199531 A | 8/2008 |

*Primary Examiner* — Fernando Alcon
(74) *Attorney, Agent, or Firm* — Brundidge & Stanger, P.C.

(57) ABSTRACT

A captured image displaying device generates a video signal for causing a thumbnail image of a video taken by an imaging device to be displayed on a map. A synthesis unit generates a video signal for synthesizing and displaying a thumbnail image of a video of an imaging device in an image display area provided in association with an imaging position of the imaging device on a map. When there are imaging positions of a plurality of imaging devices in the image display area, the synthesis unit generates a video signal that causes thumbnail images of videos of the plurality of imaging devices to be switched and displayed in the image display area in a predetermined sequence, or generates a video signal that splits the image display area and causes the thumbnail images of the videos of the plurality of imaging devices to be displayed in split areas.

6 Claims, 10 Drawing Sheets

(51) Int. Cl.
*H04N 7/18* (2006.01)
*H04N 5/262* (2006.01)
*H04N 21/47* (2011.01)
*H04N 21/44* (2011.01)

(56) References Cited

U.S. PATENT DOCUMENTS

| | | | | |
|---|---|---|---|---|
| 2002/0021281 | A1* | 2/2002 | Asami | G01C 21/367 |
| | | | | 345/156 |
| 2002/0054162 | A1* | 5/2002 | Fujihara | G06F 1/1616 |
| | | | | 715/846 |
| 2008/0307360 | A1* | 12/2008 | Chaudhri | G06F 9/451 |
| | | | | 715/835 |
| 2009/0007019 | A1* | 1/2009 | Kobayashi | H04N 1/00244 |
| | | | | 715/838 |
| 2009/0100363 | A1* | 4/2009 | Pegg | G01C 21/3682 |
| | | | | 715/765 |
| 2009/0115854 | A1* | 5/2009 | Hio | H04N 5/23203 |
| | | | | 348/207.1 |
| 2010/0246965 | A1* | 9/2010 | Epshtein | G06K 9/00711 |
| | | | | 382/187 |
| 2010/0329642 | A1* | 12/2010 | Kam | H04N 21/440263 |
| | | | | 386/280 |
| 2011/0047513 | A1* | 2/2011 | Onogi | H04N 21/440263 |
| | | | | 715/838 |
| 2011/0193966 | A1* | 8/2011 | Golan | H04N 7/181 |
| | | | | 348/159 |
| 2012/0169769 | A1* | 7/2012 | Minamino | G06T 17/05 |
| | | | | 345/629 |
| 2014/0178038 | A1* | 6/2014 | Mutsuro | H04N 5/232 |
| | | | | 386/241 |
| 2015/0085114 | A1* | 3/2015 | Ptitsyn | H04N 7/183 |
| | | | | 348/143 |
| 2018/0075061 | A1* | 3/2018 | Purumala | G06F 16/29 |

* cited by examiner

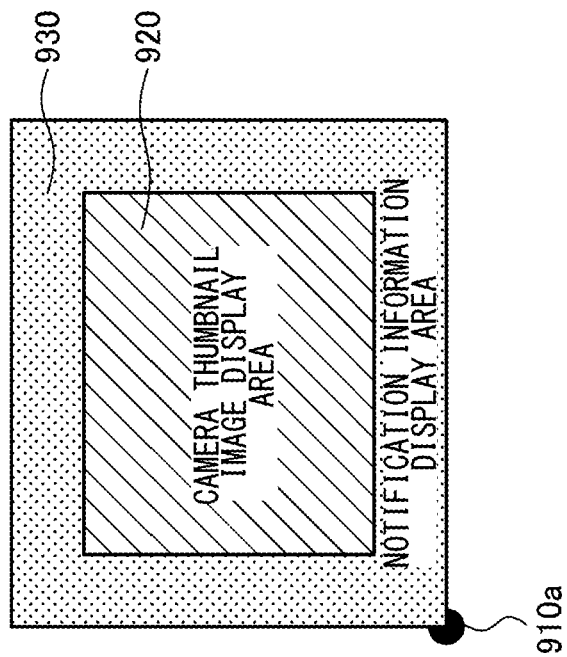
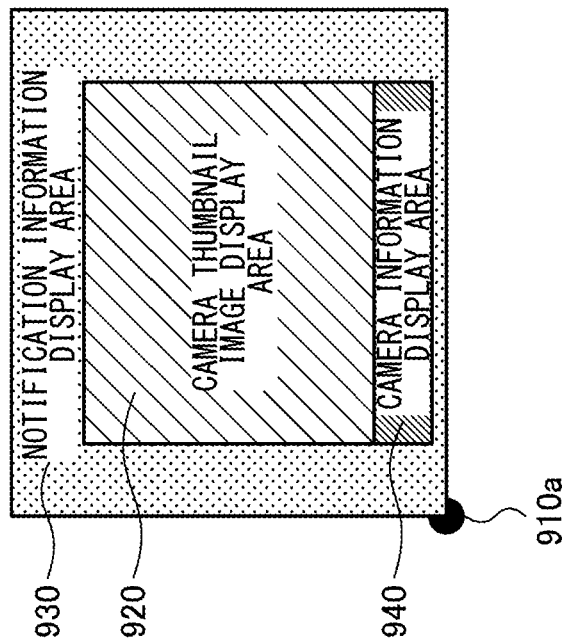
FIG.7A
FIG.7B

CAPTURED IMAGE DISPLAY DEVICE, CAPTURED IMAGE DISPLAY METHOD, AND CAPTURED IMAGE DISPLAY PROGRAM

BACKGROUND OF THE INVENTION

1. Field of the Invention

The present invention relates to a technology of displaying captured images.

2. Description of the Related Art

Recently, progress has been made in cameras for business applications that are configured as IP cameras, and services of distributing a stream of captured video data have become popular. In this background, there is called for a system capable of managing streaming from a large number of cameras for business applications on a cloud in an integrated manner and monitoring the conditions of cameras and streaming.

For example, patent document 1 discloses a monitoring system for arranging and displaying videos taken by cameras at a plurality of monitoring sites side by side with map data. Patent document 2 discloses a system for selection of a predetermined camera device from a plurality of camera devices whereby a relevant map display area is retrieved from a database and displayed, a selection range of a predetermined form including a predetermined number of cameras is displayed in the map display area, and the predetermined camera device is selected from the camera devices located in the selection range.
[patent document 1] JP11-102495
[patent document 2] JP2008-199531

In monitoring a plurality of cameras using the system disclosed in patent document 1 or patent document 2, it is difficult to concurrently check captured images in association with the camera positions without averting one's from the image.

SUMMARY OF THE INVENTION

In this background, one purpose of the present invention is to provide a technology of displaying captured images that allows a user to check captured images easily in association with the camera positions.

The captured image displaying device according to one embodiment of the present invention is adapted to generate a video signal for causing a thumbnail image of a video taken by an imaging device to be displayed on a map, the device comprising: a synthesis unit that generates a video signal for synthesizing and displaying a thumbnail image of a video of an imaging device in an image display area provided in association with an imaging position of the imaging device on a map. When there are imaging positions of a plurality of imaging devices in the image display area, the synthesis unit generates a video signal that causes thumbnail images of videos of the plurality of imaging devices to be switched and displayed in the image display area in a predetermined sequence, or generates a video signal that splits the image display area and causes the thumbnail images of the videos of the plurality of imaging devices to be displayed in split areas.

Another embodiment of the present invention relates to a captured image display method. The method is adapted to generate a video signal for causing a thumbnail image of a video taken by an imaging device to be displayed on a map, the method comprising: generating a video signal for synthesizing and displaying a thumbnail image of a video of an imaging device in an image display area provided in association with an imaging position of the imaging device on a map. When there are imaging positions of a plurality of imaging devices in the image display area, the generating of a video signal generates a video signal that causes thumbnail images of videos of the plurality of imaging devices to be switched and displayed in the image display area in a predetermined sequence, or generates a video signal that splits the image display area and causes the thumbnail images of the videos of the plurality of imaging devices to be displayed in split areas.

Optional combinations of the aforementioned constituting elements, and implementations of the invention in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 7A and 7B show the camera image display area the first camera of FIG. 6;

DETAILED DESCRIPTION OF THE INVENTION

The invention will now be described by reference to the preferred embodiments. This does not intend to limit the scope of the present invention, but to exemplify the invention.

Figure 1:
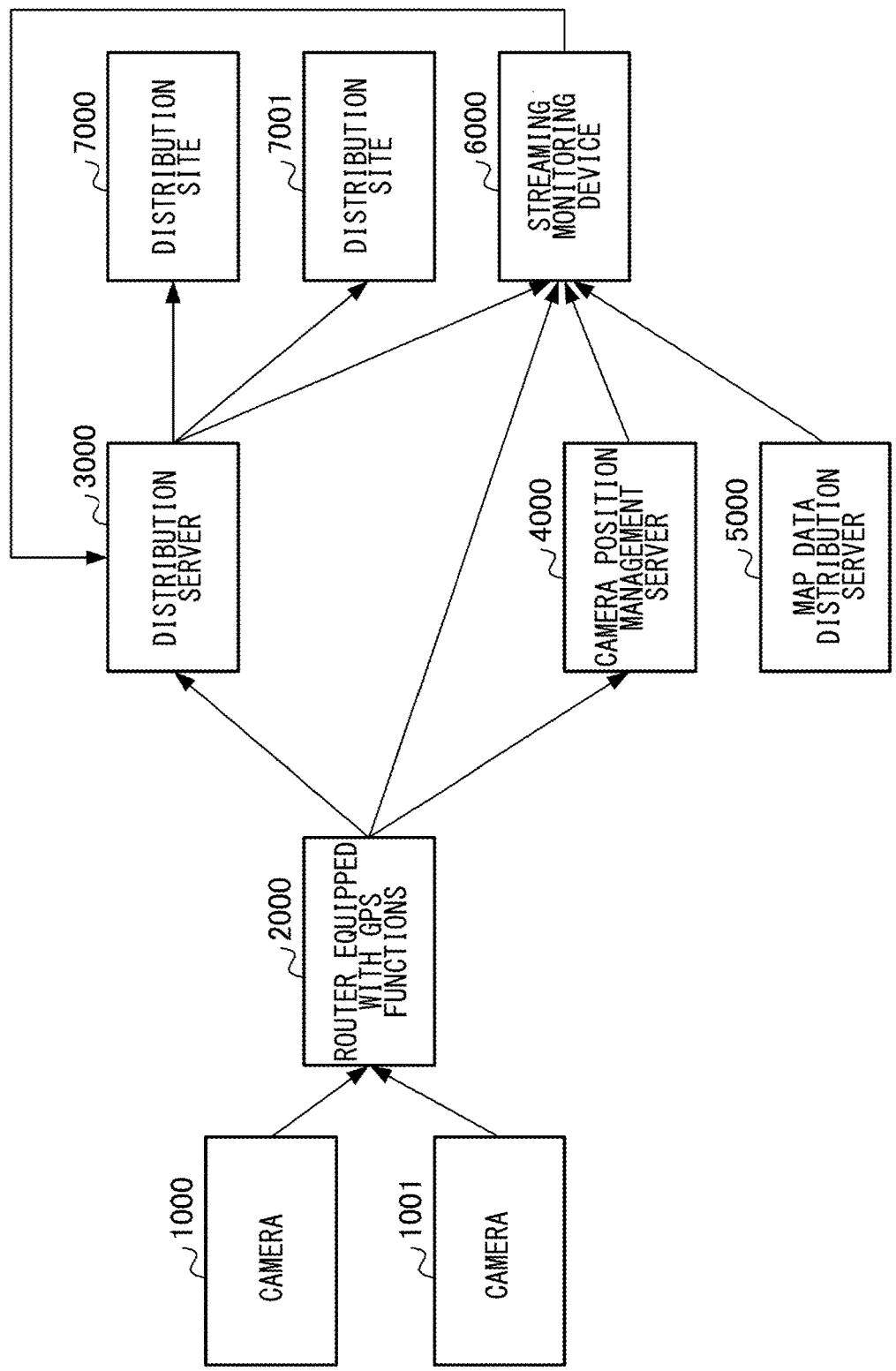
FIG. 1 shows a configuration of a video data streaming monitoring system according to the embodiment.

FIG. 1 shows a configuration of a video data streaming monitoring system according to the embodiment. The video data streaming monitoring system includes cameras (imaging devices) 1000, 1001, a router 2000 equipped with GPS functions, a distribution server 3000, a camera position management server 4000, a map data distribution server 5000, a streaming monitoring device 6000, and distribution sites 7000, 7001.

The cameras 1000, 1001 are connected to the router 2000 equipped with GPS functions via Wireless LAN such as Wi-Fi. The description here relates to a mode in which the cameras 1000, 1001 are connected to the router 2000 equipped with GPS functions by wireless LAN. Alternatively, the cameras 1000, 1001 may be connected to the router 2000 equipped with GPS functions via USB, etc., or the cameras 1000, 1001 may have built-in GPS functions.

The router 2000 equipped with GPS functions is connected to the distribution server 3000, the camera position management server 4000, and the streaming monitoring device 6000 via a network. The distribution server 3000 is connected to the streaming monitoring device 6000 and the distribution sites 7000, 7001 via a network. The camera position management server 4000 is connected to the streaming monitoring device 6000 via a network. The map data distribution server 5000 is connected to the streaming monitoring device 6000 via a network. The streaming monitoring device 6000 is connected to the distribution server 3000 via a network.

The cameras 1000, 1001 encode the video taken at the respective sites and transmit streaming data to the distribution server 3000 via the router 2000 equipped with GPS functions. In this case, the streaming data represents a full High Definition (HD) video having an image size of 1920 pixels×1080 pixels, and the frame rate is 30 fps.

The distribution server 3000 transcodes the streaming data transmitted from the router 2000 equipped with GPS functions and transmits the transcoded data to one or more distribution sites 7000, 7001. The distribution server 3000 may distribute streaming data that differ in the resolution or frame rate to the distribution sites 7000, 7001, respectively. The plurality of distribution sites 7000, 7001 may be receivers of a plurality of different broadcast stations or a plurality of receivers of one broadcast station.

The distribution server 3000 is capable of distributing the streaming data transmitted from the router 2000 equipped with GPS functions to the streaming data monitoring device 6000.

The cameras 1000, 1001 transmit a thumbnail image of the video being taken (called "camera thumbnail image") to the streaming monitoring device 6000 via the router 2000 equipped with GPS functions. The camera thumbnail image is, for example, a still image of the QVCA size. Further, the camera thumbnail image is compressed by intra-frame coding according to an image compression scheme such as JPEG and MPEG and is transmitted accordingly. Furthermore, the streaming monitoring device 6000 may acquire the camera thumbnail image from the cameras 1000, 1001 using a WEB API. It is noted that the WEB API is an application program interface to be called from a predefined program using HyperText Transfer Protocol (HTTP).

The distribution server 3000 transmits a thumbnail image of pre-transcoded streaming data transmitted from the router 2000 equipped with GPS functions (referred to as "streaming thumbnail image") or a thumbnail image of transcoded streaming data (referred to as "distribution thumbnail image") to the streaming monitoring device 6000.

The router 2000 equipped with GPS functions transmits GPS information at least including the latitude and longitude to the camera position management server 4000 as camera position information on the cameras 1000, 1001. The description here relates to a mode in which the router 2000 equipped with GPS functions and the camera position management server 4000 are connected via a network. Alternatively, the router 2000 equipped with GPS functions and the camera position management server 4000 may be integrated to form a bridge equipped with GPS functions.

The camera position management server 4000 stores the GPS information input from the router 2000 equipped with GPS functions and transmits the GPS information as the camera position information to the streaming monitoring device 6000. It is noted that the GPS information is not always input to the camera position management server 4000 from the router 2000 equipped with the GPS functions. A user may input the GPS information to the camera position management server 4000 via a WEB screen displayed in a browser so that the GPS information may be recorded in the camera position management server 4000. Alternatively, the GPS information may be input to the camera position management server 4000 using a recording medium that stores the GPS information in advance so that the GPS information may be recorded in the camera position management server 4000.

The map data distribution server 5000 transmits map data to the streaming monitoring device 6000.

The streaming monitoring device 6000 transmits distribution control data to the distribution server 3000. The distribution server 3000 transcodes the streaming data transmitted from the cameras 1000, 1001 as appropriate based on the distribution control data and distributes the transcoded data to the distribution sites 7000, 7001.

The distribution sites 7000, 7001 receive the streaming data distributed from the distribution server 3000 and decodes the streaming data for use. The distribution sites 7000, 7001 are capable of isolating the streaming data transmitted from the cameras 1000, 1001 from each other for use.

Figure 2:
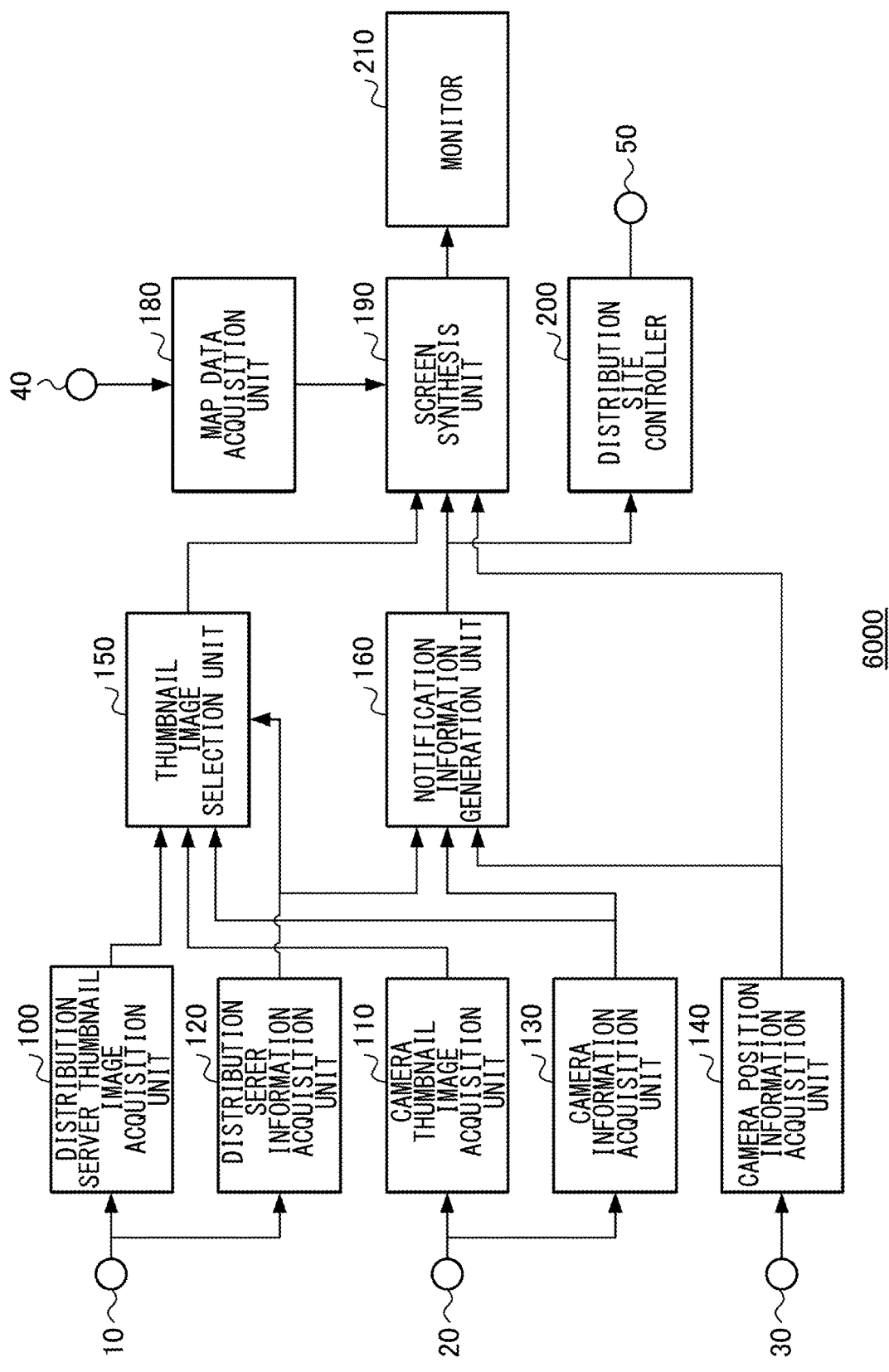
FIG. 2 shows a configuration of the streaming monitoring device of FIG. 1.

FIG. 2 shows a configuration of the streaming monitoring device 6000.

The streaming monitoring device 6000 includes a distribution server thumbnail image acquisition unit 100, a camera thumbnail image acquisition unit 110, a distribution server information acquisition unit 120, a camera information acquisition unit 130, a camera position information acquisition unit 140, a thumbnail image selection unit 150, a notification information generation unit 160, a map data acquisition unit 180, a screen synthesis unit 190, a distribution site controller 200, and a monitor 210. The distribution server thumbnail image acquisition unit 100, the camera thumbnail image acquisition unit 110, the distribution server information acquisition unit 120, the camera information acquisition unit 130, the camera position information acquisition unit 140, the thumbnail image selection unit 150, the notification information generation unit 160, the map data acquisition unit 180, the screen synthesis unit 190, and the distribution site controller 200 may be comprised of a CPU, RAM, or ROM, or comprised of a combination of these.

The distribution server thumbnail image acquisition unit 100 and the distribution server information acquisition unit 120 are described here as being separate, but the distribution server thumbnail image acquisition unit 100 and the distribution server information acquisition unit 120 may be integrated. Similarly, the camera thumbnail image acquisition unit 110 and the camera information acquisition unit 130 may be integrated.

The streaming monitoring device 6000 may be configured as a server-client system. In this case, the screen synthesis unit 190 and the monitor 210 are provided on the client side. The screen synthesis unit 190 of the client functions as a browser, receives map data, image data, and notification information from a server via a network, and synthesizes the image and the notification information on the map, and displays the synthesized result on the monitor 210. The description here relates to a configuration in which the streaming monitoring device 6000 includes the map data acquisition unit 180. When the map data is received from an external server, the streaming monitoring device 6000 may not include the map data acquisition unit 180, and the screen synthesis unit 190 of the client may function as a browser, acquire the map data from the external server, display the map in the screen, and synthesize the image and the notification information on the map. Further, in the case the processing load is distributed to the distribution server, the distribution server thumbnail image acquisition unit 100, the distribution server information acquisition unit 120, and the thumbnail image selection unit 150 may be provided on the client side.

A terminal 10 is connected to the distribution server 3000, a terminal 20 is connected to the router 2000 equipped with GPS functions, a terminal 30 is connected to the camera position management server 4000, a terminal 40 is connected to the map data distribution server 5000, and a terminal 50 is connected to the distribution server 3000.

The distribution server thumbnail image acquisition unit 100 acquires a "streaming thumbnail image" or a "distribution thumbnail image" from the terminal 10 connected to the distribution server 3000 and outputs the acquired image to the thumbnail image selection unit 150.

The distribution server information acquisition unit 120 acquires distribution server information from the terminal 10 connected to the distribution server 3000 and outputs the distribution server information to the thumbnail image selection unit 150 and the notification information generation unit 160.

The distribution server information includes "distribution execution information" indicating whether the distribution server 3000 is distributing the streaming data of the cameras 1000, 1001, and "streaming information" indicating the transmission quality of the streaming data of the cameras 1000, 1001 such as bit rate, delay time, and lost and recovered packets. Information on lost and recovered packets include a sum of packets since the start of streaming up to the present and a sum of packets during a predetermined, immediately preceding period of time. The value of lost packets (hereinafter, "packet loss") is determined by subtracting the number of packets received from the receiver from the number of packets transmitted from the transmitter.

The camera thumbnail image acquisition unit 110 acquires a "camera thumbnail image" from the terminal 20 connected to the router 2000 equipped with GPS functions and outputs the acquired image to the thumbnail image selection unit 150.

The camera information acquisition unit 130 acquires camera information from the terminal 20 connected to the router 2000 equipped with GPS functions and outputs the acquired camera information to the thumbnail image selection unit 150 and the notification information generation unit 160. It is noted that the camera information acquisition unit 130 acquires the camera information from the cameras 1000, 1001 using the WEB API.

The camera information includes "camera identification information" for identifying the cameras 1000, 1001, "streaming execution information" indicating whether the cameras 1000, 1001 are streaming, "streaming subject information" indicating the URL of the destination of streaming when the cameras 1000, 1001 are streaming, and "camera error information" indicating low storage capacity or low battery level in the cameras 1000, 1001. The camera identification information includes a serial number unique to the camera, a user-configurable camera name, etc. It is assumed here that the "streaming subject information" includes a URL representing the cameras 1000, 1001 and a URL representing the distribution server 3000.

The thumbnail image selection unit 150 refers to the "streaming execution information" input from the camera information acquisition unit 130 to determine whether the cameras 1000, 1001 are streaming. When the cameras 1000, 1001 are streaming, the thumbnail image selection unit 150 refers to the "distribution execution information" input from the distribution server information acquisition unit 120 to determine whether the distribution server 3000 is distributing the streaming data of the cameras 1000, 1001.

When the distribution server 3000 are distributing the streaming data of the cameras 1000, 1001, the thumbnail image selection unit 150 selects the "distribution thumbnail image" input from the distribution server thumbnail image acquisition unit 100 as the thumbnail image that should be synthesized in the screen (referred to as "selected thumbnail image") and outputs the selected thumbnail image to the screen synthesis unit 190.

When the distribution server 3000 is not distributing the streaming data of the cameras 1000, 1001, the thumbnail image selection unit 150 selects the "streaming thumbnail image" input from the distribution server thumbnail image acquisition unit 100 as the thumb nail image that should be synthesized in the screen and outputs the selected thumbnail image to the screen synthesis unit 190.

When the cameras 1000, 1001 are not streaming, the thumbnail image selection unit 150 selects the "camera thumbnail image" input from the camera thumbnail image acquisition unit 110 as the thumbnail image that should be synthesized in the screen and outputs the selected thumbnail image to the screen synthesis unit 190.

The camera position information acquisition unit 140 acquires the camera position information from the terminal 30 connected to the camera position management server 4000 and outputs the camera position information to the notification information generation unit 160 and the screen synthesis unit 190.

The map data acquisition unit 180 acquires map data from the terminal 40 connected to the map data distribution server 5000 and outputs the map data to the screen synthesis unit 190.

The notification information generation unit 160 uses the streaming information input from the distribution server information acquisition unit 120, the camera information input from the camera information acquisition unit 130, and the camera position information input from the camera position information acquisition unit 140 to generate the notification information and outputs the notification information to the screen synthesis unit 190 and the distribution site controller 200 along with the streaming information, camera information, and camera position information.

The screen synthesis unit 190 synthesizes the selected thumbnail image input from the thumbnail image selection unit 150 and the notification information input from the notification information generation unit 160 on the map data input from the map data acquisition unit 180 and displays the synthesized result on the monitor 210.

The distribution site controller 200 outputs the streaming information input from the notification information generation unit 160 to the terminal 50 connected to the distribution server 3000. The distribution server 3000 refers to the streaming information and selects the distribution sites 7000, 7001 in accordance with the situation of communication.

Figure 3:
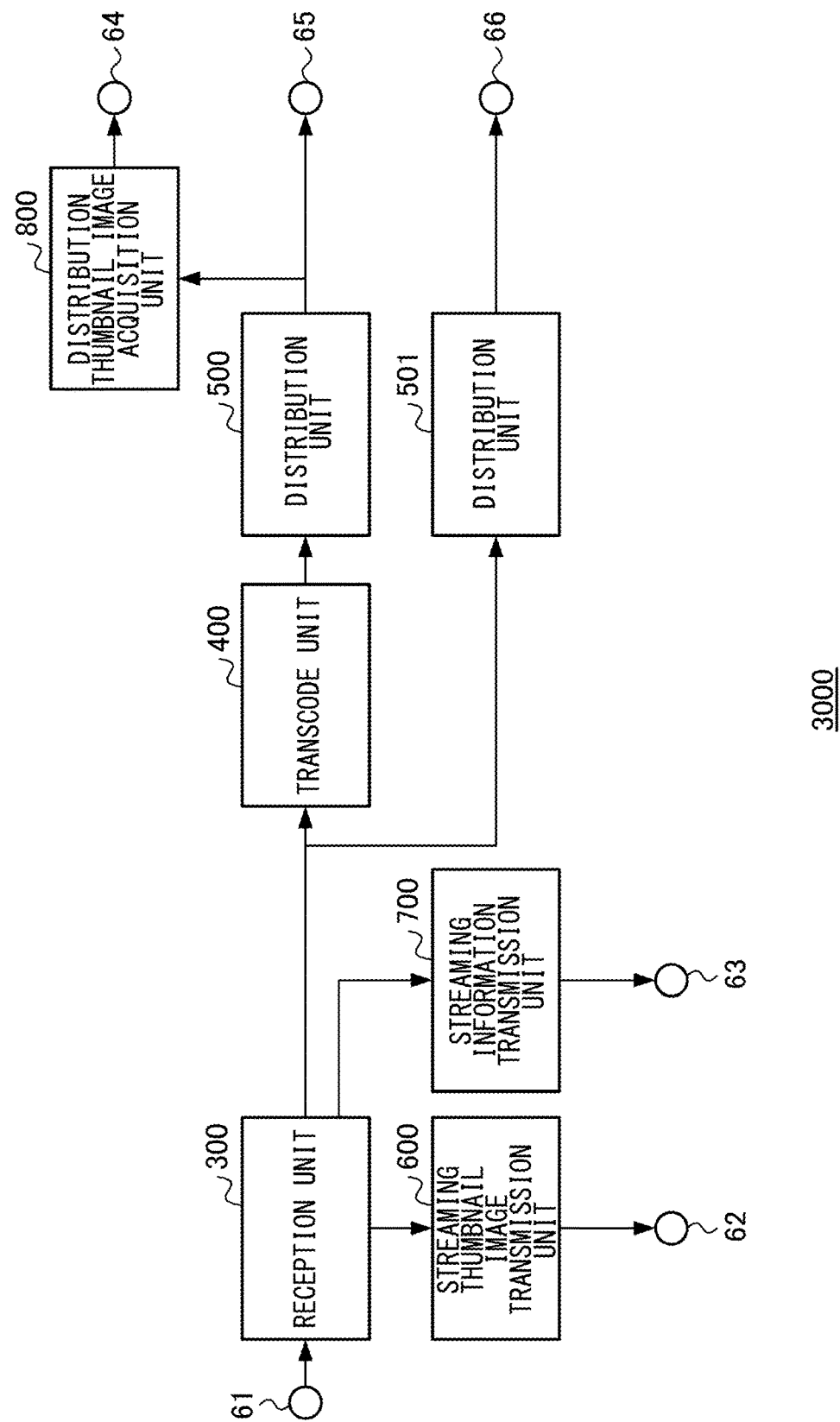
FIG. 3 shows a configuration of the streaming data distribution server of FIG. 1.

FIG. 3 shows a configuration of the distribution server 3000.

The distribution server 3000 includes a reception unit 300, a transcode unit 400, distribution units 500, 501, a streaming thumbnail image transmission unit 600, a streaming information transmission unit 700, and a distribution thumbnail image transmission unit 800.

A terminal 61 is connected to the router 2000 equipped with GPS functions, terminals 62, 63, and 64 are connected to the streaming monitoring device 6000, a terminal 65 is connected to the distribution site 7000, and a terminal 66 is connected to the distribution site 7001.

The reception unit 300 outputs the streaming data input from the terminal 61 connected to the router 2000 equipped with GPS functions to the transcode unit 400 and the distribution unit 501. Further, the reception unit 300 generates a streaming thumbnail image by extracting a still image for one frame from the received streaming data as necessary and outputs the streaming thumbnail image to the streaming thumbnail image transmission unit 600. The streaming thumbnail image is, for example, a still image of the QVCA size. The streaming thumbnail image may be generated at predetermined intervals. For example, the streaming thumbnail image is generated at intervals of three seconds. The reception unit 300 outputs streaming information indicating the transmission quality of the streaming data such as bit rate, delay time, and packet loss to the streaming information transmission unit 700.

The transcode unit 400 transcodes the streaming data of a bit rate A input from the reception unit 300 to produce an encoded stream of a bit rate B and outputs the encoded stream to the distribution unit 500.

The distribution unit 500 outputs the encoded stream input from the transcode unit 400 to the terminal 65 connected to the distribution site 7000. Further, the distribution unit 500 generates a distribution thumbnail image by extracting a still image for one frame from the encoded stream as necessary and outputs the distribution thumbnail image to the distribution thumbnail image transmission unit 800. The distribution thumbnail image is, for example, a still image of the QVCA size. The distribution thumbnail image may be generated at predetermined intervals. For example, the streaming thumbnail image is generated at intervals of three seconds.

The distribution unit 501 outputs the streaming data input from the reception unit 300 to the terminal 66 connected to the distribution site 7001 as necessary.

The streaming thumbnail image transmission unit 600 outputs the streaming thumbnail image input from the reception unit 300 to the terminal 62 connected to the streaming monitoring device 6000.

The distribution thumbnail image transmission unit 800 outputs the distribution thumbnail image input from the distribution unit 500 to the terminal 64 connected to the streaming monitoring device 6000.

When the distribution server 3000 is distributing streaming data, the distribution thumbnail image transmission unit 800 provides the distribution thumbnail image of the transcoded, encoded stream to the streaming monitoring device 6000. When the distribution server 3000 is not distributing streaming data, the streaming thumbnail image transmission unit 600 provides the streaming thumbnail image of the pre-transcoded streaming data to the streaming monitoring device 6000.

The streaming information transmission unit 700 outputs the streaming information to the terminal 63 connected to the streaming monitoring device 6000.

Figure 4:
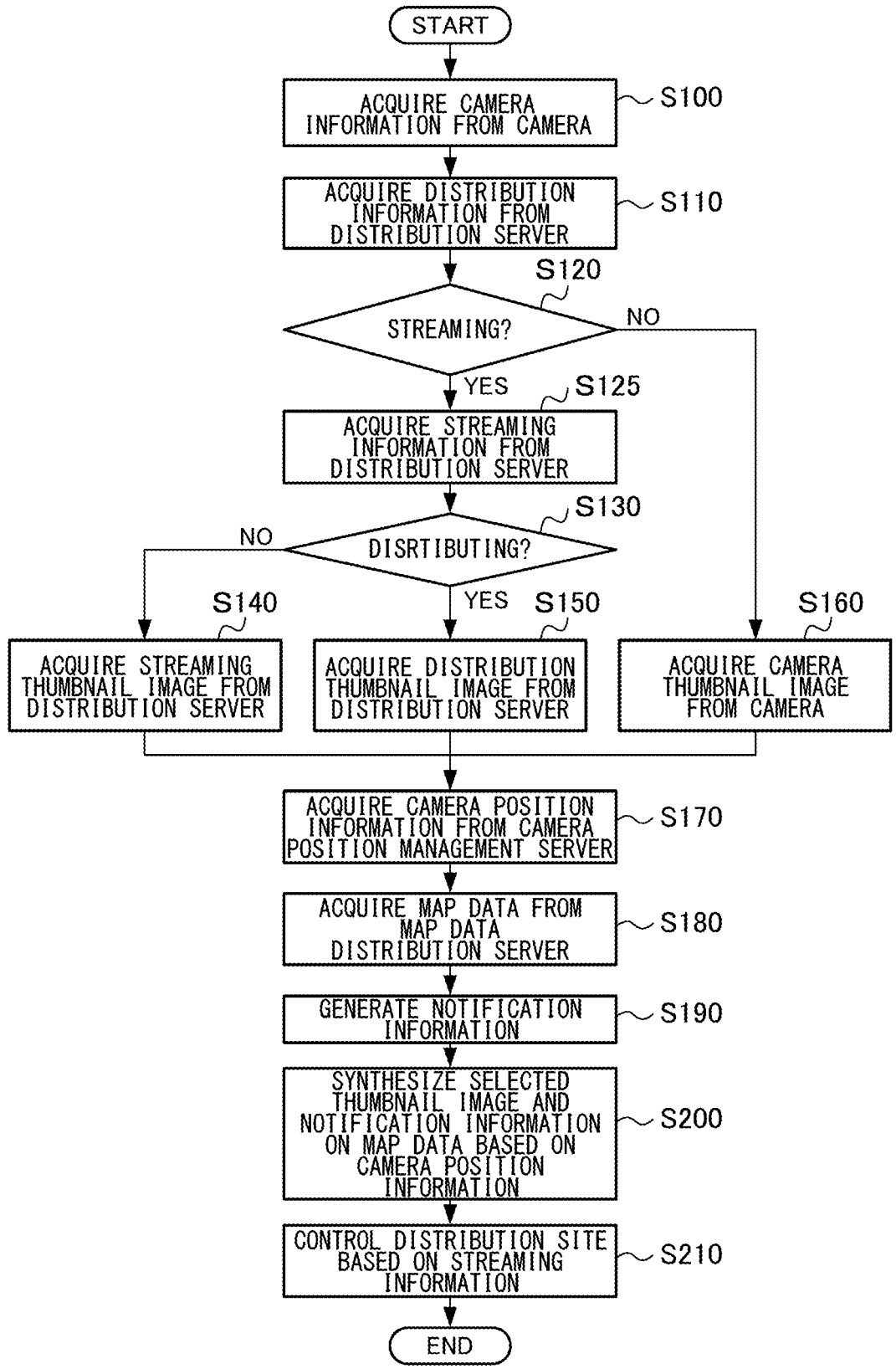
FIG. 4 is a flowchart showing the steps of managing streaming data by the streaming monitoring device of FIG. 2.

FIG. 4 is a flowchart showing the steps of managing streaming data by the streaming monitoring device 6000.

These steps of management are performed at update intervals of three seconds for the cameras 1000, 1001. A description will now be given of the case of the camera 1000.

The camera information acquisition unit 130 acquires the camera information on the camera 1000 from the router 2000 equipped with GPS functions and outputs the camera information to the thumbnail image selection unit 150 and the notification information generation unit 160 (S100). The camera information includes the identification information on the cameras 1000, the streaming execution information indicating whether the camera 1000 is streaming and the error information on the camera 1000.

The distribution server information acquisition unit 120 acquires the distribution server information from the distribution server 3000 and outputs the distribution server information to the thumbnail image selection unit 150 and the notification information generation unit 160 (S110). The distribution server information includes the distribution execution information indicating whether the distribution server 3000 is distributing the streaming data of the camera 1000 and the streaming information indicating the transmission quality of the streaming data.

The thumbnail image selection unit 150 checks whether the streaming execution information indicates that the camera 1000 is streaming (S120).

When the streaming execution information indicates that the camera 1000 is streaming (YES in S120), the distribution server information acquisition unit 120 acquires the streaming information from the distribution server 3000 and outputs the streaming information to the notification information generation unit 160 (S125).

Subsequently, the thumbnail image selection unit 150 checks whether the distribution execution information indicates that the distribution server 3000 is distributing the streaming data of the camera 1000 (S130).

When the distribution execution information indicates that the distribution server 3000 is distributing the streaming data of the camera 1000 (YES in S130), the distribution server thumbnail image acquisition unit 100 acquires the distribution thumbnail image from the distribution server 3000, and the thumbnail image selection unit 150 selects the distribution thumbnail image as the selected thumbnail image and outputs the selected image to the screen synthesis unit 190 (S150).

When the distribution execution information does not indicate that the distribution server 3000 is distributing the streaming data of the camera 1000 (NO in S130), the distribution server thumbnail image acquisition unit 100 acquires the streaming thumbnail image from the distribution server 3000, and the thumbnail image selection unit 150 selects the streaming thumbnail image as the selected thumbnail image and outputs the selected image to the screen synthesis unit 190 (S140).

When the streaming execution information does not indicate that the camera 1000 is streaming (NO in S120), the camera thumbnail image acquisition unit 110 acquires the camera thumbnail image from the camera 1000, and the thumbnail image selection unit 150 selects the camera thumbnail image as the selected thumbnail image and outputs the selected image to the screen synthesis unit 190 (S160).

Following step S140, S150, or S160, the camera position information acquisition unit 140 acquires the camera position information from the camera position information management server 4000 and outputs the camera position information to the notification information generation unit 160 and the screen synthesis unit 190 (S170).

The map data acquisition unit 180 acquires the map data from the map data distribution server 5000 and outputs the map data to the screen synthesis unit 19 (S180).

The notification information generation unit 160 uses the streaming information input from the distribution server information acquisition unit 120, the camera information input from the camera information acquisition unit 130, and the camera position information input from the camera position information acquisition unit 140 to generate the notification information and outputs the notification information to the screen synthesis unit 190 along with the streaming information, camera information, and camera position information (S190).

The screen synthesis unit 190 displays the map data in a map data display area, generates a synthesized screen by synthesizing the selected thumbnail image and the notification information in the map data display area based on the camera position information, and outputs the synthesized screen to the monitor 210 (S200). The monitor 210 displays the synthesized screen. By way of example, the screen of the monitor has the Wide Quad eXtended Graphics Array (WQXGA) size of 2560 pixels×1600 pixels. By way of example, the map data display area includes 2000 pixels× 1200 pixels.

The distribution site controller 200 controls the distribution site based on the streaming information (S210). A description will be given of the control of the distribution site. The distribution site controller 200 transmits the streaming information to the distribution server 3000, and the distribution server 3000 refers to the streaming information and causes the distribution sites 7000, 7001 to be selected as the destination of distribution of streaming data in accordance with the situation of communication. For example, when the sum of lost packets indicated in the streaming information exceeds a predetermined value, the distribution server 3000 switches the destination of distribution of the streaming data hitherto distributed to the distribution site 7000 to the other distribution site 7001.

As described above, when the cameras 1000, 1001 are streaming, the thumbnail image is acquired from the distribution server 3000. When the cameras 1000, 1001 are not streaming, i.e., when the cameras 1000, 1001 are in standby state such as a preview mode in which the streaming data is not streamed, the thumbnail image is acquired from the cameras 1000, 1001. This makes it unnecessary for the cameras 1000, 1001 to encode the streaming data and encode the thumbnail image at the same time. Therefore, the streaming monitoring device 6000 can monitor images taken by the cameras while, at the same time, controlling the processing volume of the cameras 1000, 1001 during streaming.

The streaming execution information is described as being included in the camera information. Alternatively, the streaming execution information may be included in the distribution server information. In this case, the distribution server 3000 determines whether streaming is executed by monitoring the situation of reception of streaming from the router 2000 equipped with GPS functions and generates the distribution server information including the streaming execution information. The distribution server information acquisition unit 120 acquires the distribution server information from the terminal 10 and outputs the distribution server information to the thumbnail image selection unit 150 and the notification information generation unit 160. With this configuration, the processing load on the cameras is reduced.

The update interval of the thumbnail image is described as being three seconds. The update interval is not limited to this so long as it is possible to synthesize the selected thumbnail image and the notification information in the map data display area at predetermined update intervals based on the camera position information. For example, when the streaming thumbnail image and the distribution thumbnail image are used as the selected thumbnail image, it is possible, by using an update interval of one second, which is shorter than when the camera thumbnail image is used as the selected thumbnail image, to monitor images taken by the cameras with a high precision while, at the same time, controlling the processing volume of the camera during streaming.

The image size of the thumbnail image is described as being QVGA. However, the image size of the thumbnail image is not limited to this so long as it is possible to synthesize and display the selected thumbnail image and the notification information in the map data display area at predetermined update intervals based on the camera position information. For example, when the distribution thumbnail image is used as the selected thumbnail image, it is possible to monitor images taken by the cameras with a high precision while, at the same time, controlling the processing volume of the camera during streaming, by using VGA, which is an image size larger than when the camera thumbnail image is used as the selected thumbnail image.

The distribution server thumbnail image acquisition unit 100 is described as acquiring the distribution thumbnail image from the distribution server 3000 (S150) when the distribution execution information indicates that the distribution server 3000 is distributing the streaming data of the camera 1000 (YES in S130). Further, the distribution server thumbnail image acquisition unit 100 is described as acquiring the streaming thumbnail image from the distribution server 3000 (S140) when the distribution execution information does not indicate that the distribution server 3000 is distributing the streaming data of the camera 1000 (NO in S130). However, the distribution server thumbnail image acquisition unit 100 may not be able to acquire the distribution thumbnail image or the streaming thumbnail image from the distribution server 3000. For example, this occurs when the distribution thumbnail image or the streaming thumbnail image cannot be acquired from the distribution server 3000 due to the situation of communication that has grown poorer, or when a distribution server that cannot acquire the distribution thumbnail image or the streaming thumbnail image is selected.

Therefore, the thumbnail image selection unit 150 may be provided with a storage unit (not shown). The storage unit stores a predefined image. A predefined image is, for example, an image that gives an alert such as "the thumbnail image cannot be acquired".

Where such a feature is provided, and where the distribution server thumbnail image acquisition unit 100 is configured to acquire the distribution thumbnail image from the distribution server 3000 (S150), the distribution server thumbnail image acquisition unit 100 may read the predefined image from the storage and selects the predefined image as the selected thumbnail image when the distribution thumbnail image cannot be acquired from the distribution server 3000.

Where the distribution server thumbnail image acquisition unit 100 is configured to acquire the streaming thumbnail image from the distribution server 3000 (S140), the distribution server thumbnail image acquisition unit 100 may read the predefined image from the storage and selects the predefined image as the selected thumbnail image when the streaming thumbnail image cannot be acquired from the distribution server 3000.

Where the thumbnail image selection unit 150 is provided with the storage unit described above, this embodiment can be applied to the distribution server 3000 not provided with the streaming thumbnail image transmission unit 600 and the distribution thumbnail image transmission unit 800. In other words, the distribution server may be identified from the streaming subject information including the URL indicating the distribution server, and a determination as to whether the distribution thumbnail image can be acquired from the distribution server 3000 may be made by examining whether the identified server is a server provided with the streaming thumbnail image transmission unit 600 and the distribution thumbnail image transmission unit 800. In the case of a server provided with the streaming thumbnail image transmission unit 600 and the distribution thumbnail image transmission unit 800, the streaming thumbnail image or the distribution thumbnail image may be selected as the selected thumbnail image and, otherwise, the predefined image may be selected as the selected thumbnail image. By employing this feature, the versatility is enhanced.

It is assumed here that the storage unit for storing the predefined image is provided. Alternatively, the storage unit may not be provided. In this case, when the streaming thumbnail image or the distribution thumbnail image cannot be acquired from the distribution server 3000 in S140 or S150, a character string signifying the streaming subject information (e.g., streaming subject information or a character string short for the streaming subject information), instead of the selected thumbnail image, may be synthesized with the notification information in the map data display area to produce the synthesized screen, and the synthesized screen may be output to the monitor 210.

A detailed description will now be given of a method of synthesizing the selected thumbnail image and the notification information on the map data based on the camera position information and displaying the synthesized result.

Figure 5:
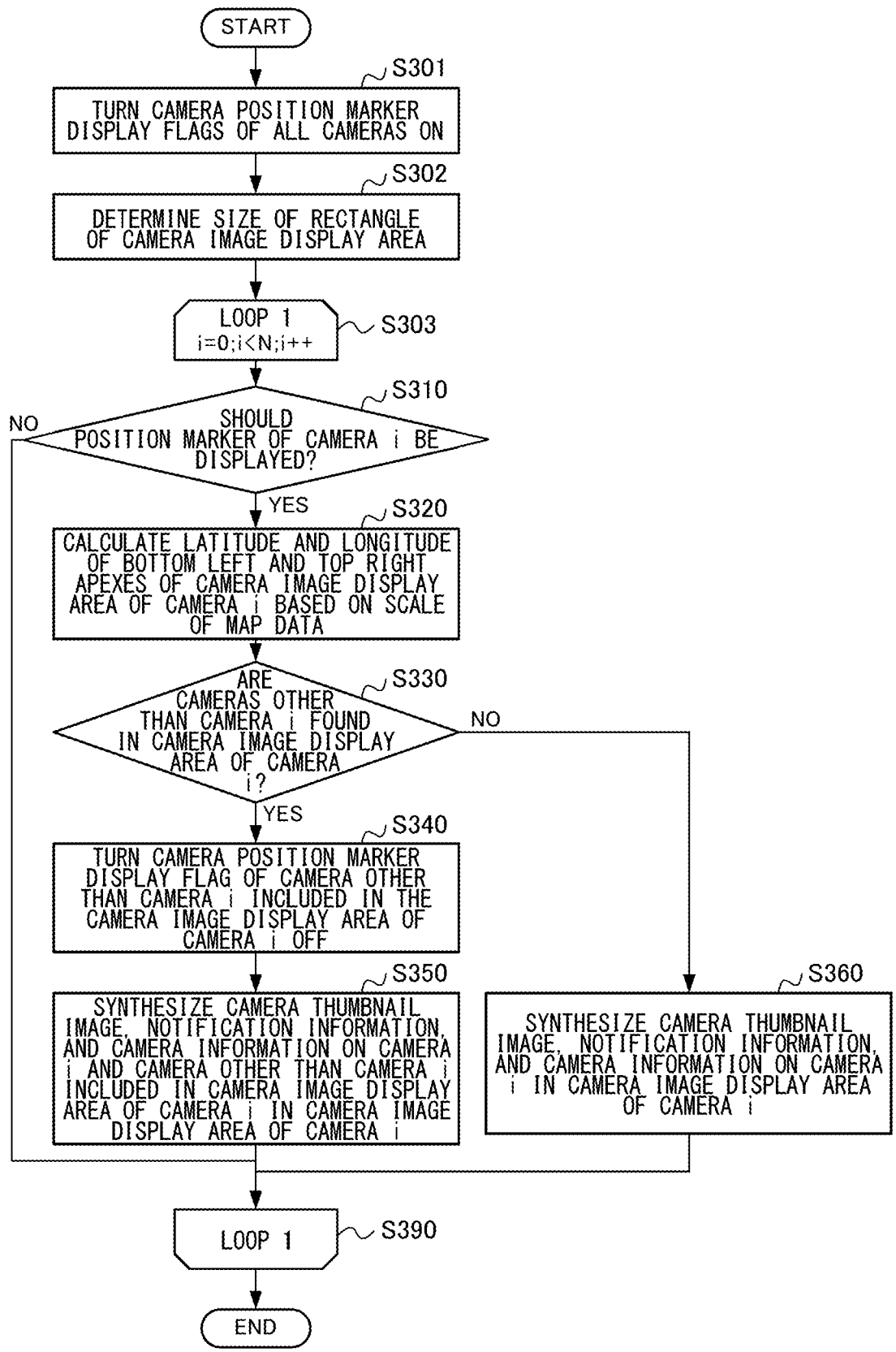
FIG. 5 is a flowchart showing the steps for image synthesis performed by the screen synthesis unit of FIG. 2.

FIG. 5 is a flowchart showing the steps for image synthesis performed by the screen synthesis unit 190.

In the following description, it is assumed that the total number of cameras displayed is N. It will be assumed that the process of the flowchart of FIG. 5 is performed every time the scale of the map data is changed.

First, the screen synthesis unit 190 turns the camera position marker display flags of all cameras ON (S301).

The screen synthesis unit 190 then determines the size of the rectangle of a camera image display area (S302). The size of the rectangle of the camera image display area is a value predefined in units of pixels. The size of the rectangle of the camera image display area is determined in accordance with the map data display area and is assumed to be at least sufficient to display a plurality of camera image display areas in the map data display area. By way of example, the size is assumed to be 160 pixels×120 pixels.

Subsequently, the screen synthesis unit 190 repeats the steps S303 through S390 for camera i. The sequence of processing the N cameras is assumed to be predefined. In this case, it is assumed that the sequence is based on the importance configured by the user. Alternatively, the sequence of processing the N cameras may be the sequence in which the cameras are registered in the streaming management system.

First, the camera position marker display flag of camera i is checked to see if it is ON (S310).

When the camera position marker display flag of camera i is ON (YES in S310), the latitude and longitude of the bottom left and top right apexes of the camera image display area of camera i are calculated based on the scale of the map data (S320). Of the four apexes of the camera image display area, the two apexes at diagonally opposite positions may be selected to derive the latitude and longitude. The latitude and longitude of the bottom right and top left apexes of the camera image display area may be calculated.

Following step S320, the camera image display area of camera i is checked to see if a camera other than camera i is found, based on the latitude and longitude of the bottom left and top right apexes of the camera image display area of camera i and on the camera position information of the camera other than camera i (S330).

When a camera other than camera i is found in the camera image display area of camera i (YES in S330), the camera position marker display flag of the camera other than camera i included in the camera image display area of camera i is turned OFF (S340). In this case, camera i will be a representative camera, and the camera position information on camera i will be the position representative of the cameras found in the camera image display area of camera i. Whether a camera j is found in the camera image display area of camera i can be determined by comparing the latitude and longitude of the bottom left and top right apexes of the camera image display area of camera i with the camera position information of camera j.

In the case the camera position information on camera i or camera j cannot be acquired, or the camera position information on camera i or camera j represents an illegitimate value, the last position, for which the camera position information of the relevant camera was acquired, is used as the camera position information. Alternatively, a predetermined camera position may be used as the camera position information when the camera position information on camera i or camera j cannot be acquired or when the camera position information on camera i or camera j represents an illegitimate value.

Following step S340, a video signal, in which the camera thumbnail image, notification information, and camera information on camera i and the camera other than camera i included in the camera image display area of camera i are synthesized in the camera image display area of camera i, is generated (S350).

When no cameras other than camera i are found in the camera image display area of camera i (NO in S330), a video signal, in which the camera thumbnail image, notification information, and camera information on camera i are synthesized in the camera image display area of camera i, is generated (S360).

When the camera position marker display flag of camera i is OFF (NO in S310), control proceeds to step S390. The camera for which the camera position marker display flag is determined to be OFF is the camera found in the camera image display area of the representative camera.

When steps from S303 through S390 have been repeated for the N cameras, the process is terminated.

Figure 6:
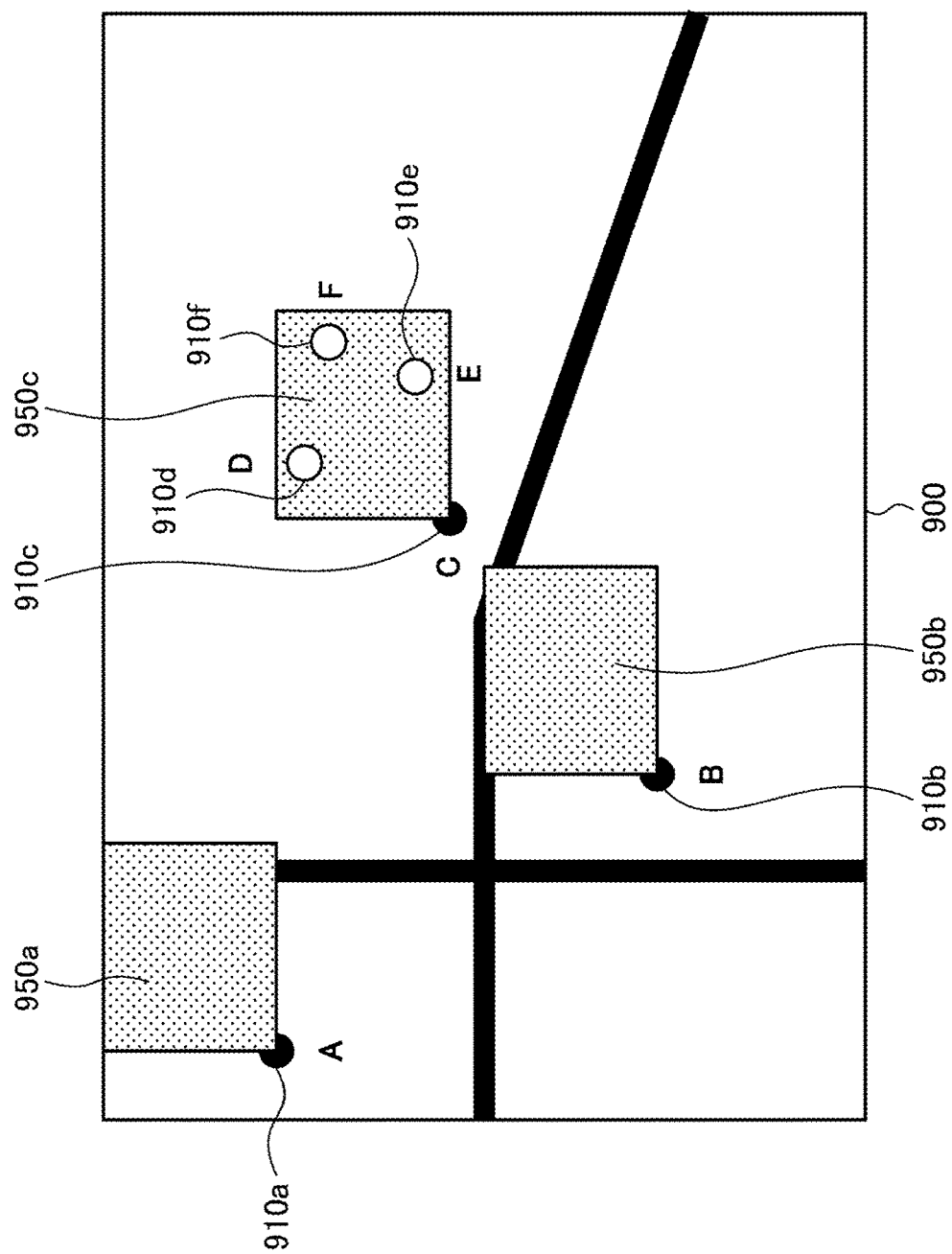
FIG. 6 shows an example of synthesis and display performed by the screen synthesis unit of FIG. 2.

FIG. 6 shows an example of synthesis and display performed by the screen synthesis unit 190. Six cameras A-F are located in the map data display area 900.

Camera position markers 910a, 910b, and 910c indicating the camera positions are displayed in the map data display area 900 in black circles, based on camera position information LA, LB, and LC of the first, second, and third cameras A, B, and C, respectively. Camera image display areas 950a, 950b, and 950c are displayed in the screen adjacent to the camera position markers 910*a*, 910*b*, and 910*c* of the first, second, and third cameras A, B, and C, respectively. The camera position markers are at the bottom left positions of the respective camera image display areas but may be at the top left positions or top right positions.

Camera position markers 910*d*, 910*e*, and 910*f* of the fourth, fifth, and sixth cameras D, E, and F located in the camera image display area 950*c* of the third camera C are not displayed in the screen but the positions of the fourth, fifth, and sixth cameras D, E, and F are shown in white circles for the purpose of explanation.

FIGS. 7A and 7B show the camera image display area 950*a* of the first camera A of FIG. 6.

As shown in FIG. 7A, the camera image display area 950*a* includes a camera thumbnail image display area 920, a notification information display area 930, and a camera information display area 940.

The selected thumbnail image of the first camera A is scaled to fit the size of the camera thumbnail image display area 920 and displayed therein.

The notification information of the first camera A is displayed in the notification information display area 930 around the outer frame of the camera thumbnail image display area 920.

A detailed description will be given of the notification information. The notification information generation unit 160 generates the notification information according to the following condition. The notification information includes a packet loss error notification, packet loss alert notification, packet recovery alert notification, camera error notification, and lost camera position notification. The notifications are managed by notification types and can be discriminated from each other by the notification type.

When the notification information generation unit 160 determines that the sum of lost packets during a predetermined, immediately preceding period indicated in the streaming information exceeds a predetermined threshold value T1, the notification information generation unit 160 generates a packet loss error notification.

When the notification information generation unit 160 determines that the sum of lost packets during a predetermined, immediately preceding period indicated in the streaming information exceeds a predetermined threshold value T2 (T2≤T1), the notification information generation unit 160 generates a packet loss alert notification.

When the notification information generation unit 160 determines that the sum of the number of packets re-transmitted when packets are lost and the number of packets subjected to Forward Error Correction (FEC) for correction of an error during a predetermined, immediately preceding period exceeds a predetermined threshold value T3 (T3≥T1), the notification information generation unit 160 generates a packet recovery alert notification. For example, packet loss occurs when packets of streaming information are lost due to an increase in the load on the server or the network, but packet loss may occur due to a failure or the like in the router or relay device.

Generally, if an increase in the load on the server or the network is the cause, a packet recovery alert notification will be generated initially in response to an increase in the load on the server or the network. A packet loss alert notification is generated in response to a further increase in the load on the server or the network. A packet loss error notification is generated in response to a still further increase in the load on the server or the network. In other words, by reducing the load on the server or the network or increasing the resources of the server or the network at the stage when a packet recovery alert notification is generated, packet loss is inhibited. Meanwhile, if a failure or the like in the router or relay device is the cause, a packet recover alert notification is not issued. A packet loss alert notification is generated initially and then a packet loss error notification is issued. In this way, counter measures for an increase in the load on the server or the network or for a failure or the like in the router or relay device can be taken by learning the sequence of generation of a packet recovery alert notification, packet loss alert notification, and packet loss error notification.

When the notification information generation unit 160 determines that the camera information indicates an error, the notification information generation unit 160 generates a camera error notification. The camera error information includes low battery, low memory card capacity, failure of streaming, etc.

When the notification information generation unit 160 determines that the camera position information cannot be acquired, or the camera position information represents an illegitimate value, the notification information generation unit 160 generates a lost camera position notification.

By way of example, the notification type such as packet loss error notification, packet loss alert notification, or packet recovery alert notification is presented in a character string in the notification information display area 930 of FIG. 7A and is provided with a background color. In the absence of the notification information, nothing is displayed in the notification information display area 930. The color of the character string and the background color displayed in the notification information display area 930 change in accordance with the notification type and flash at predetermined intervals. The predetermined flash interval may be changed depending on the notification type. The background color may be red in the case of a packet loss alert notification and yellow in the case of a packet loss error notification. This allows the user to understand where on the map a problem with the camera is occurring at a glance.

The camera name, etc. included in the camera identification information is displayed in the camera information display area 940 below the camera thumbnail image display area 920.

FIG. 7*a* shows that the camera thumbnail image display area 920, the notification information display area 930, and the camera information display area 940 are shown in the camera image display area 950*a*. However, the camera image display area 950*a* may at least include the camera thumbnail image display area 920 and the notification information display area 930 so that the configuration is not limited to that of FIG. 7A. FIG. 7B shows an example of displaying the camera image display area 950*a* including the camera thumbnail image display area 920 and the notification information display area 930 and not including the camera information display area 940.

Figure 8A:
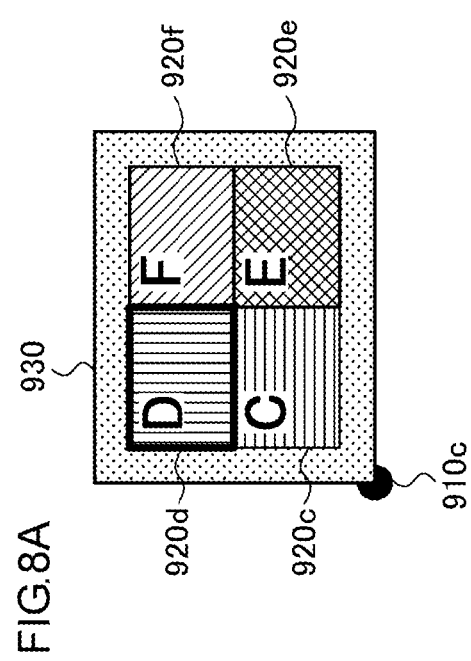
FIGS. 8A and 8B show the camera image display area of the third camera of FIG. 6.
Figure 8B:
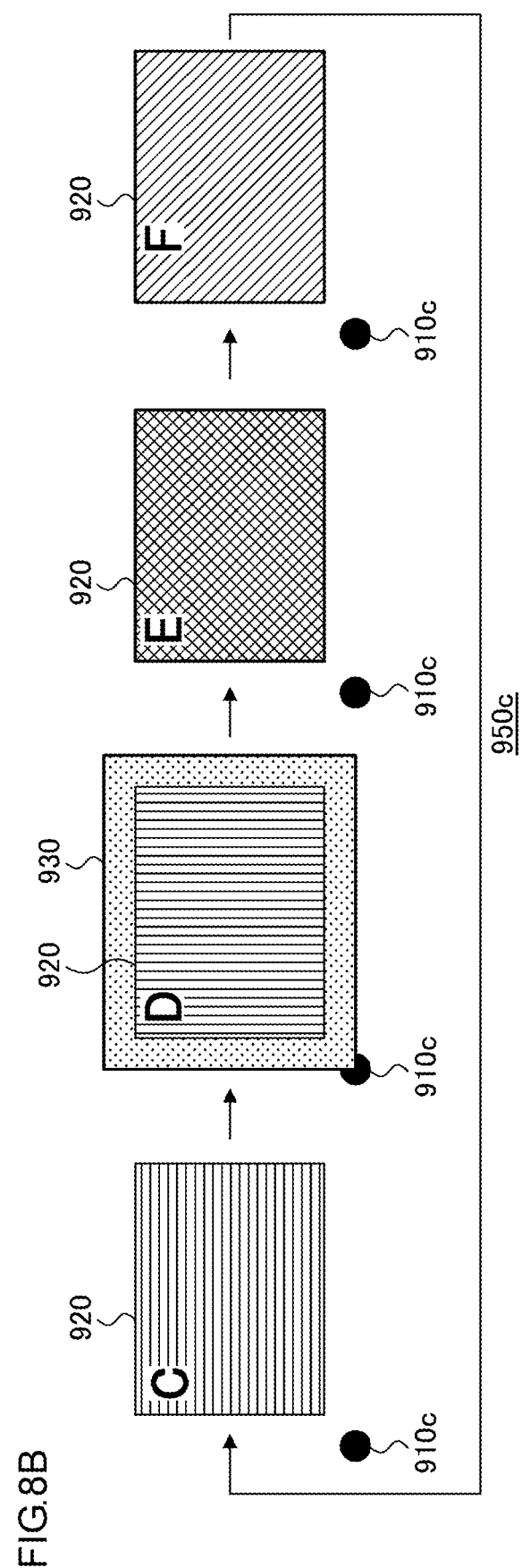

FIGS. 8A and 8B show the camera image display area 950*c* of the third camera C of FIG. 6. For the sake of simplicity, the explanation with reference to FIG. 8 is based on an example in which the camera thumbnail image display area and the notification information display area are displayed. The symbols C, D, E, and F shown in FIG. 8 are used for an illustrative purpose and are not shown in the actual screen.

A description will first be given of an example of display in FIG. 8A. The selected thumbnail images of the four cameras C, D, E, and F are scaled and displayed to fit the sizes of the respective areas produced by the equally dividing the camera thumbnail image display area into four. The selected thumbnail images of the four cameras C, D, E, and F are displayed in the camera thumbnail image display area in accordance with the camera position information on the respective cameras. As shown in FIG. 8A, the camera thumbnail image display area is divided into four areas 920c, 920d, 920e, and 920f. The selected thumbnail image of the camera C is displayed in the area 920c, the selected thumbnail image of the camera D is displayed in the area 920d, and the selected thumbnail image of the camera E is displayed in the area 920e, and the selected thumbnail image of the camera F is displayed in the area 920f.

The notification information display area 930 is displayed only when the notification information is available for at least one of the four cameras C, D, E, and F. If the notification information is not available for any of the four cameras C, D, E, and F, the notification information display area 930 is not displayed. A description is given here of a case where the notification information is available for a plurality of cameras. For example, given that the notification information is available for three cameras C, D, and E, the notification information of the camera C flashes at predetermined intervals, then the notification information of the camera D flashes at predetermined intervals, and then the notification information of the camera E flashes at predetermined intervals in the notification information display area 930. These steps are repeated. FIG. 8A shows a state in which the notification information of the camera D is being displayed in the notification information display area 930. A frame is displayed around the selected thumbnail image of the camera D to highlight the selected thumbnail image of the camera D, to let the user know that the notification information of the camera D is displayed in the notification information display area 930. Similarly, when the notification information of the cameras C, E is displayed in the notification information display area 930, the selected thumbnail images of the cameras C, E are respectively highlighted.

The camera position markers of the four cameras C, D, E, and F of FIG. 8A are represented by the camera position marker of the representative camera C. The camera position marker in this case should be discriminated from the camera position marker of the solitary camera C shown when there are no cameras in the camera image display area 950c other than the camera C. By way of example, this requirement is addressed by configuring the camera position marker corresponding to a plurality of cameras to be colored or shaped differently from the camera position marker for the solitary camera. Further, the camera position marker may be colored or shaped differently depending on one of the the camera thumbnail, streaming thumbnail, and distribution thumbnail.

A description will now be given of an example of display of FIG. 8B. The display period of thumbnail images is configured to be equal to the update interval of thumbnail images. The selected thumbnail images of the four cameras C, D, E, and F are displayed in the thumbnail image display area at the display period of selected thumbnail images. In other words, the selected thumbnail image of the camera C is displayed for three seconds, the selected thumbnail image of the camera D is displayed for three seconds, the selected thumbnail image of the camera E is displayed for three seconds, and the selected thumbnail image of the camera F is displayed for three seconds in the camera thumbnail image display area 920. These steps are repeated. In this example, the display period of selected thumbnail images is configured to be equal to the update interval of thumbnail images. Alternatively, the display period of selected thumbnail images may be configured to be equal to a value derived by dividing the update interval of thumbnail images by the number of cameras so that the selected thumbnail images of the four cameras C, D, E, and F are displayed within the update interval of thumbnail images.

The notification information of the camera displayed in the camera thumbnail image display area 920 is displayed in the notification information display area 930. The predetermined interval at which the notification information flashes is configured to be equal to or less than the update interval of thumbnail images. The notification information is caused to flash at least once while the selected thumbnail image is being displayed. In the example of FIG. 8B, the notification information of the camera D is displayed in the notification information display area 930 when the notification information of the camera D is available and the selected thumbnail image of the camera D is being displayed in the camera thumbnail image display area 920.

The display modes of FIGS. 8A and 8B may be switched depending on the number of cameras found in the camera image display area 950. In other words, in the case the number of cameras found in the camera image display area 950 is equal to or less than a predetermined number (e.g., four), the camera thumbnail image display area is split, and the thumbnail images of the plurality of cameras found in the camera image display area 950 are displayed in the split areas, as shown in FIG. 8A. In the case the number of cameras found in the camera image display area 950 exceeds a predetermined number, the thumbnail images of the plurality of cameras found in the camera image display area 950 are switched and displayed in a predetermined sequence in the camera thumbnail image display area, as shown in FIG. 8B. By switching the display modes in this way, the user can check the thumbnail images of the cameras in a screen configuration suitable for the number of cameras found in the camera image display area 950.

A click in any of the camera image display areas 950a, 950b, and 950c of FIG. 6 identifies the camera taking a video based on the camera identification information associated with the thumbnail image displayed at the clicked position and pops up the video streamed by the identified camera on the screen as a streaming video detail check screen.

By way of example, the streaming video detail check screen has the full HD size of 1920 pixels×1080 pixels and is displayed at a frame rate of 30 fps. The streaming video detail check screen is used to check the video being streamed in detail. The image size and frame rate of the streaming data are larger than the image size and frame rate of the thumbnail image. However, the streaming data may be scaled to, for example, 640 pixels×480 pixels and displayed accordingly.

The camera information, camera position information, streaming information, and notification information are displayed in character strings in the streaming video detail check screen to enable checking.

As described above, the camera position, images taken, and notification information can be concurrently monitored by synthesizing and displaying the thumbnail image and the notification information on the map data based on the camera position information.

In this embodiment, cameras other than camera i are permitted to be located in the camera image display area of camera i in the first place. For example, the scale of the map data may be adjusted so that cameras other than camera i are not found in the camera image display area of camera i as much as possible. The scale of the map data is a proportion of a reduced representation on a map relative to an actual distance and is denoted by a notation such as $\frac{1}{1000}$, in which the actual distance is the denominator and the distance on the map is the numerator. In other words, enlarging the scale of the map data shows an enlarged view of the map and reducing the sale of map data shows a reduced view of the map.

By way of specific example, an examination is made, before step S340, to see whether the scale of the map data is equal to or less than a predetermined scale and whether it is possible not to include cameras other than camera i in the camera image display area of camera i by enlarging the scale of the map data (i.e., showing further detail of the map data). When the scale of the map data is equal to or less than the predetermined scale and it is possible not to include cameras other than camera i in the camera image display area of camera i, the scale of the map data is enlarged, and the process is terminated. Step S340 may be performed when the scale of the map data is equal to or less than the predetermined scale and it is not possible not to include cameras other than camera i in the camera image display area of camera i. The predetermined scale may be determined in advance or the scale that allows a predetermined number of cameras to be displayed in the map data display area 900.

<Variation>

The camera image display areas of camera C, camera D, camera E, and camera F are described above as being configured based on the camera position marker 910*c* as shown in FIG. 8A or FIG. 8B. A variation will be described with reference to FIGS. 9 and 10A-10D. The variation differs from the embodiment described above in that the camera image display areas of camera C, camera D, camera E, and camera F are displayed such that the camera image display areas are superimposed on each other. In other words, the screen synthesis unit 190 according to this variation generates, when there are imaging positions of a plurality of imaging devices in the image display area, a video signal that causes thumbnail images of videos taken by the plurality of imaging devices to be displayed in the image display area according to a predetermined order such that the thumbnail images are superimposed on each other.

Figure 9:
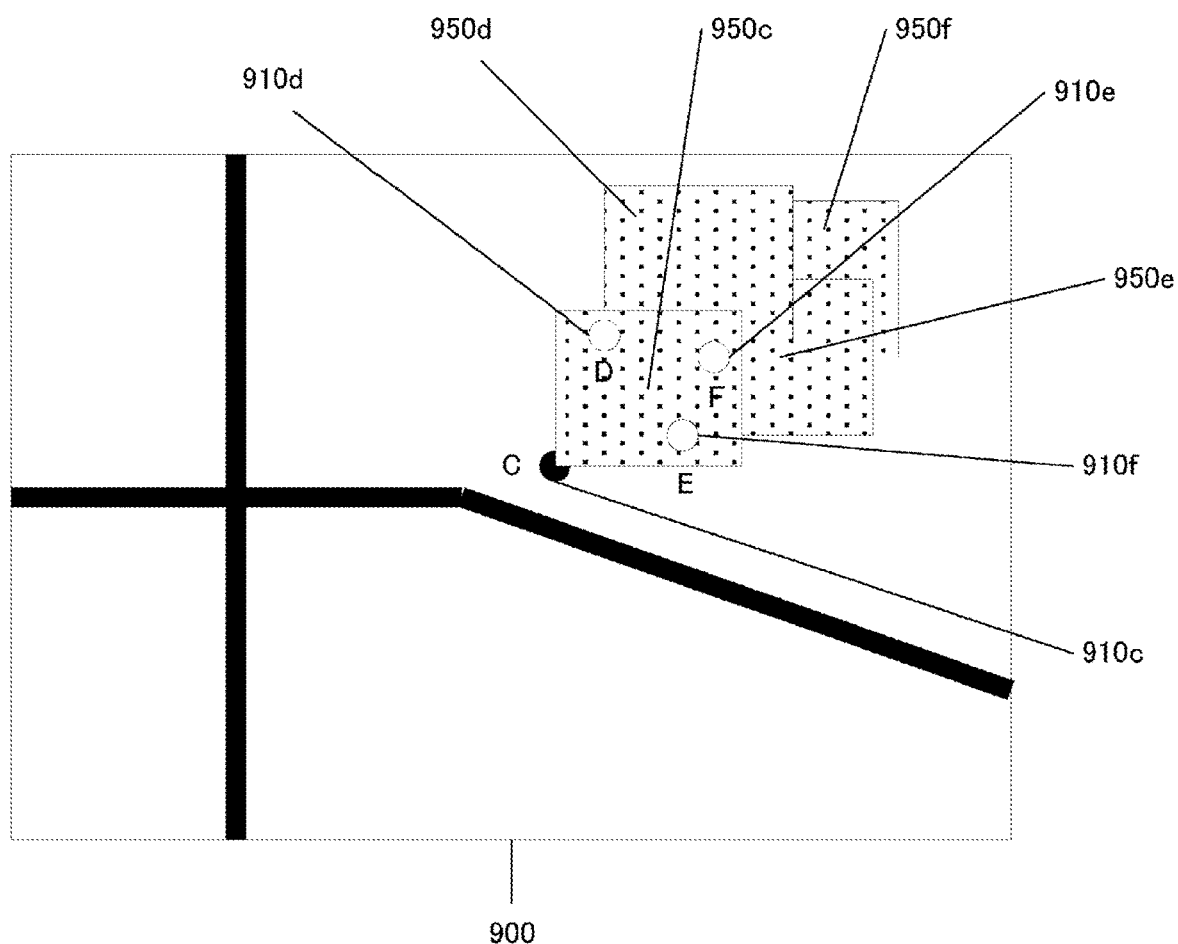
FIG. 9 shows an example of synthesis and display performed by the screen synthesis unit according to a variation.

FIG. 9 shows an example of synthesis and display performed by a screen synthesis unit 190. In this case, four cameras including camera C, camera D, camera E, and camera F are found in the map data display area 900. The camera image display areas 950*c*, 950*d*, 950*e*, and 950*f* of camera C, camera D, camera E, and camera F are respectively displayed adjacent to the camera position markers 910*c*, 910*d*, 910*e*, and 910*f* or displayed within a predetermined range from the respective camera position markers to overlap each other. Since the camera position markers 910*d*, 910*e*, and 910*f* of cameras D, E, and F are positioned behind the camera image display area 950*c*, the camera position markers 910*d*, 910*e*, and 910*f* are not displayed, but the camera position markers 910*d*, 910*e*, and 910*f* are shown in white circles for the purpose of explanation.

FIGS. 10A, 10B, 10C, and 10D show an example of displaying the camera image display areas 950*c*, 950*d*, 950*e*, and 950*f* to overlap each other. A predetermined order is defined for the camera image display areas 950*c*, 950*d*, 950*e*, and 950*f*. The camera image display area is displayed in front based on this predetermined order. Further, the predetermined order is changed at a predetermined period in such a manner as to maintain the order as defined. For example, the predetermined order may be changed so that the order is moved down periodically. The camera image display area of the highest order is changed to the camera image display area of the lowest order. Therefore, all of the camera image display areas 950*c*, 950*d*, 950*e*, and 950*f* are displayed in the forefront sequentially.

Figure 10A:
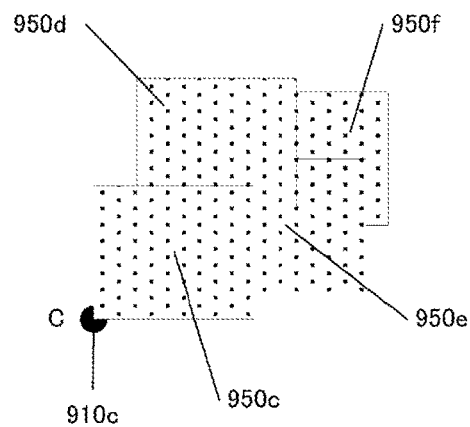
FIGS. 10A, 10B, 10C, and 10D show an example according to a variation of displaying camera image display areas to overlap each other.

FIG. 10a shows how the camera image display areas 950*c*, 950*d*, 950*e*, and 950*f* are displayed according to the order. According to the order, the camera image display area 950*c* is displayed in front of the other camera image display areas 950*d*, 950*e*, and 950*f*. Further, the camera image display area 950*d* is displayed in front of the camera image display areas 950*e* and 950*f* but is displayed behind the camera image display area 950*c*. The camera image display area 950*e* is displayed in front of the camera image display area 950*f* but is displayed behind the camera image display areas 950*c* and 950*d*. The camera image display area 950*f* is displayed behind the camera image display areas 950*c*, 950*d*, and 950*e*.

Figure 10B:
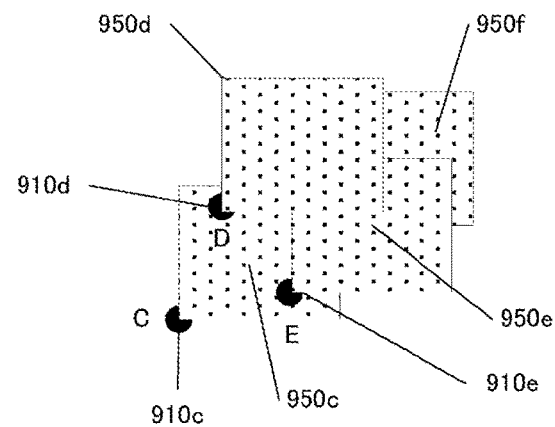

FIG. 10B shows how the order of the camera image display areas 950*c*, 950*d*, 950*e*, and 950*f* arranged in the aforementioned predetermined order is changed at a predetermined period (e.g., every 1 second) to result in the camera image display areas 950*d*, 950*e*, 950*f*, and 950*c* are displayed. According to this order, the camera image display area 950*d* is displayed in front of the other camera image display areas 950*c*, 950*e*, and 950*f*. Meanwhile, the camera image display area 950*c* is displayed behind the camera image display areas 950*d*, 950*e*, and 950*f*. The other camera image display areas 950*e* and 950*f* are displayed according to the order.

Figure 10C:
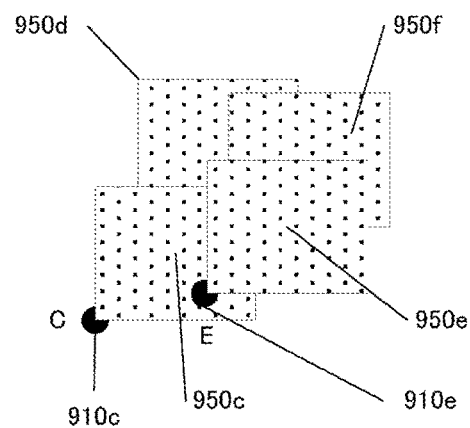

FIG. 10C shows how the order of the camera image display areas 950*d*, 950*e*, 950*f*, and 950*c* changed at a predetermined period is further changed at a predetermined period to result in the camera image display areas 950*e*, 950*f*, 950*c*, and 950*d*. According to this order, the camera image display area 950*e* is displayed in front of the other camera image display areas 950*c*, 950*d*, and 950*f*. The other camera image display areas 950*f*, 950*c*, and 950*d* are displayed according to the order.

Figure 10D:
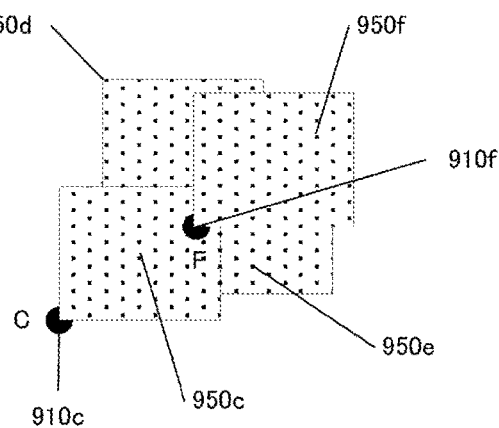

FIG. 10D shows how the order of the camera image display areas 950*e*, 950*f*, 950*c*, and 950*d* changed at a predetermined period is further changed at a predetermined period to result in the camera image display areas 950*f*, 950*c*, 950*d*, and 950*e*. According to this order, the camera image display area 950*f* is displayed in front of the other camera image display areas 950*c*, 950*d*, and 950*e*. The other camera image display areas 950*c*, 950*d*, and 950*f* are displayed according to the order. When the order is further changed at a predetermined period, the predetermined order results in the order of the camera image display area 950*c*, 950*d*, 950*e*, and 950*f*, which is described with reference to FIG. 10A.

In this variation, the camera position markers 910*c*, 910*d*, 910*e*, and 910*f* may be displayed. When the camera position markers are displayed, each camera position marker is displayed in synchronization with the associated camera image display area. In other words, the camera position markers are displayed in accordance with the predetermined order relating to the camera image display areas. The camera position marker is displayed in front of the associated camera image display area.

Referring to FIG. 10a, for example, the camera position markers 910*c*, 910*d*, 910*e*, and 910*f* are displayed according to the order of the camera image display areas 950*c*, 950*d*, 950*e*, and 950*f* arranged in the predetermined order. Accordingly, the camera position markers 910*d*, 910*e*, and 910*f* are displayed behind the camera image display area 950*c*. For this reason, the camera position markers 910*d*, 910*e*, and 910*f* are not displayed apparently.

Referring to FIG. 10B, the camera position markers 910c, 910d, 910e, and 910f are displayed according to the order of the camera image display areas 950d, 950e, 950f, and 950c arranged in the predetermined order. Accordingly, the camera position marker 910d is displayed in front of the camera image display areas 950c, 950e, and 950f. The camera position marker 910e is displayed in front of the camera image display areas 950c and 950f but is displayed behind the camera image display area 950d. The camera position marker 910f is displayed in front of the camera image display area 950c but is displayed behind the camera image display areas 950d and 950e. For this reason, the camera position marker 910f is not displayed apparently. The camera position marker 910c is displayed behind the camera image display areas 950d, 950e, and 950f, but the camera position marker 910c does not overlap the camera image display areas 950d, 950e, and 950f and so is displayed apparently.

Referring to FIG. 10C, the camera position markers 910c, 910d, 910e, and 910f are displayed according to the order of the camera image display areas 950e, 950f, 950c, and 950d arranged in the predetermined order. Further, referring to FIG. 10D, the camera position markers 910c, 910d, 910e, and 910f are displayed according to the order of the camera image display areas 950f, 950c, 950d, and 950e arranged in the predetermined order. Referring to FIG. 10C, the camera position markers 910c and 910e are displayed apparently. Referring to FIG. 10D, the camera position markers 910c and 910f are displayed apparently.

According to this variation, the camera image display areas or the camera position markers of a plurality of cameras are displayed such that the camera image display areas overlap each other or the camera position markers overlap each other. Therefore, the positions of the respective cameras are known in relation to each other.

In the case the camera image display area or the camera position marker displayed behind overlaps the camera image display area of the camera position marker displayed in front, the camera image display area or the camera position marker displayed behind according to this variation is not configured to be displayed apparently. However, the camera image display area or the camera position marker overlapping the camera image display area of the camera position marker displayed in front may be displayed in a dotted line or displayed semi-transparently. In other words, the overlapping camera image display area or the camera position marker may be displayed in a mode different from that of the camera image display area or the camera position marker not overlapping. These camera image display areas or the camera position markers may be displayed on top of the camera image display area or the camera position marker displayed in front. With this configuration, it is possible to know the relative positions of the cameras at a glance.

Often, the camera image display areas overlap each other but the camera position markers do not. Therefore, in an alternative example, the camera position markers and the camera image display areas may be displayed in a manner asynchronous with each other and in a predetermined order based on how they overlap. Further, the camera position marker may be controlled to be displayed on top of the camera image display area always, or the camera image display area may be controlled to be displayed on top of the camera position marker always.

The above-described processes can of course be implemented by hardware-based apparatus such as a CPU and a memory and can also be implemented by firmware stored in a read-only memory (ROM), a flash memory, etc., or by software on a computer, etc. The firmware program or the software program may be made available on, for example, a computer readable recording medium. Alternatively, the program may be made available from a server via a wired or wireless network. Still alternatively, the program may be made available in the form of data broadcast over terrestrial or satellite digital broadcast systems.

Described above is an explanation based on an exemplary embodiment. The embodiment is intended to be illustrative only and it will be understood by those skilled in the art that various modifications to constituting elements and processes could be developed and that such modifications are also within the scope of the present invention.

What is claimed is:

1. A captured image displaying device adapted to generate a video signal for causing a thumbnail image of a video taken by an imaging device to be displayed on a map, the captured image displaying device comprising:
   a processor that generates a video signal for synthesizing and displaying a thumbnail image of a video of an imaging device in an image display area provided in association with an imaging position of the imaging device on a map,
   wherein when there are imaging positions of a plurality of imaging devices in the image display area, the processor generates a video signal that causes thumbnail images of videos of the plurality of imaging devices to be switched and displayed repeatedly setting as a switching period of the thumbnail images of videos a value derived by dividing an update interval in which the thumbnail images of videos are obtained by the number of the plurality of imaging devices in the image display area in a predetermined sequence.

2. The captured image display device according to claim 1, wherein the processor adds, to the thumbnail image, notification information that includes a transmission quality of the video taken by the imaging device or error information on the imaging device, and when there are imaging positions of the plurality of imaging devices in the image display area, generates a video signal that causes the notification information to be displayed when, of the plurality of imaging devices, the thumbnail image of the imaging device for which the notification information is available is displayed in the image display area.

3. The captured image display device according to claim 1, wherein when a number of the plurality of imaging devices found in the image display area is equal to or less than a predetermined number, the processor generates a video signal that splits the image display area provided in association with an imaging position of a representative imaging device and causes the thumbnail images of the videos of the plurality of imaging devices to be displayed in split areas, and when the number of the plurality of imaging devices found in the image display area exceeds the predetermined number, the processor generates a video signal that causes the thumbnail images of videos of the plurality of imaging devices to be switched and displayed at the switching period in the image display area in a predetermined sequence.

4. A captured image displaying device adapted to generate a video signal for causing a thumbnail image of a video taken by an imaging device to be displayed on a map, the captured image displaying device comprising:
   a processor that generates a video signal for synthesizing and displaying a thumbnail image of a video of an imaging device in an image display area provided in association with an imaging position of the imaging device on a map, wherein when there are imaging positions of a plurality of imaging devices in the image display area, the processor generates a video signal that causes thumbnail images of videos of the plurality of imaging devices to be displayed repeatedly setting as a switching period of the thumbnail images of videos a value derived by dividing an update interval in which the thumbnail images of videos are obtained by the number of the plurality of imaging devices in the image display area according to a predetermined order so as to overlap each other.

5. A captured image displaying method adapted to generate a video signal for causing a thumbnail image of a video taken by an imaging device to be displayed on a map, the method comprising:

generating a video signal for synthesizing and displaying a thumbnail image of a video of an imaging device in an image display area provided in association with an imaging position of the imaging device on a map, wherein when there are imaging positions of a plurality of imaging devices in the image display area, the generating of a video signal generates a video signal that causes thumbnail images of videos of the plurality of imaging devices to be switched and displayed repeatedly setting as a switching period of the thumbnail images of videos of a value derived by dividing an update interval in which the thumbnail images of videos are obtained by the number of the plurality of imaging devices in the image display area in a predetermined sequence.

6. A non-transitory recording medium having embedded thereon a captured image displaying program that, in response to execution, cause a computer to perform operations comprising:

generating a video signal for synthesizing and displaying a thumbnail image of a video of an imaging device in an image display area provided in association with an imaging position of the imaging device on a map, wherein when there are imaging positions of a plurality of imaging devices in the image display area, generating a video signal that causes thumbnail images of videos of the plurality of imaging devices to be switched and displayed repeatedly setting as a switching period of the thumbnail images of videos a value derived by dividing an update interval in which the thumbnail images of videos are obtained by the number of the plurality of imaging devices in the image display area in a predetermined sequence.

* * * * *